April 27, 1954 M. C. SANZ ET AL 2,676,773
AIRCRAFT INSULATED FUEL TANK
Filed Jan. 8, 1951
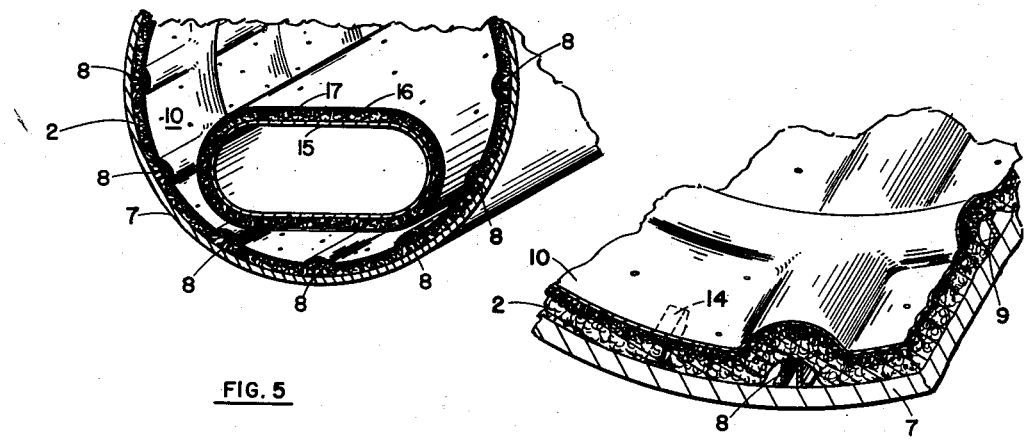
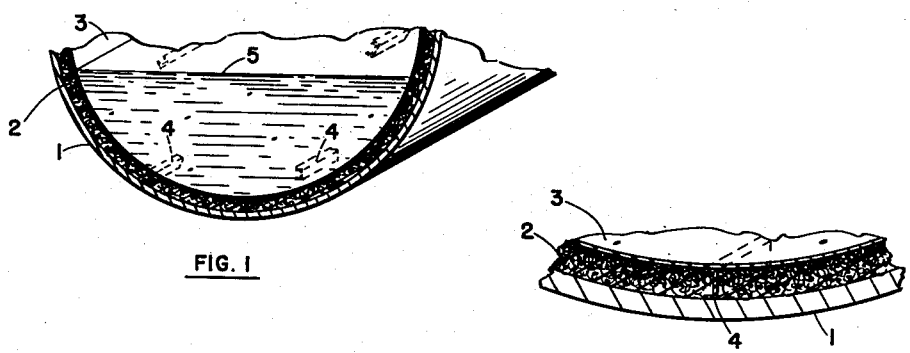
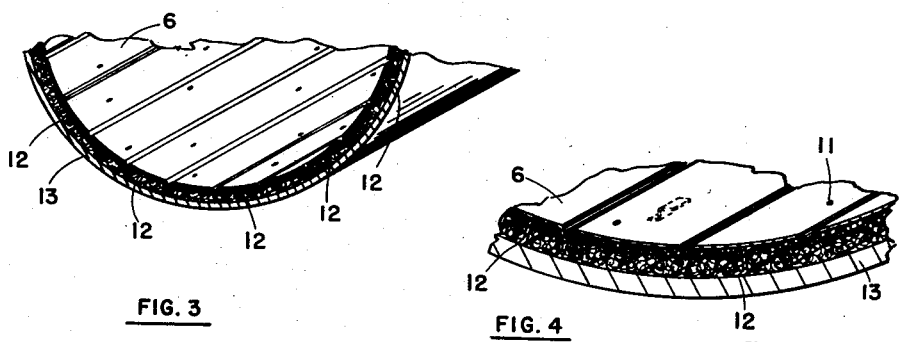
INVENTORS
MANUEL C. SANZ
JAMES CASTELFRANCO
BY
*William P. Lane*
ATTORNEY Patented Apr. 27, 1954

2,676,773

UNITED STATES PATENT OFFICE 2,676,773

AIRCRAFT INSULATED FUEL TANK

Manuel C. Sanz, Los Angeles, and James Castelfranco, South Gate, Calif., assignors to North American Aviation, Inc.

Application January 8, 1951, Serial No. 205,014

11 Claims. (Cl. 244—135)

This invention pertains to heat insulation, and particularly to an improved insulation for the interior of a tank containing liquids and particularly of such a tank as integrated with an aircraft structure.

It has long been recognized that light-weight, dry, porous materials have good insulating properties. When it is desired to insulate a body of liquid to prevent heat from entering the liquid it is therefore preferable to insulate the outside of the container with such a dry insulation so that the fluid never comes in contact with the insulating material. If the fluid is allowed to wet the insulating material the insulating properties thereof are largely destroyed because the gas voids in the material are filled with fluid which has a much higher conductivity than the gas. In aircraft designed for operation at very high speed, sections of the fuselage or wings are normally given over entirely to containing one or more of the propulsive fluids such as liquid oxygen, alcohol, or any of the other hydrocarbons normally used for fuels. If a separate tank is used to contain the fuel and this tank is then mounted within the fuselage or wing of the aircraft, in effect, there exists a double wall for which an obvious weight and space penalty is paid. Past practice has been to use such a double wall construction with dry insulating material between the walls, the external wall being a structural part of the aircraft and defining the external contour thereof, while the inner wall is simply a tank wall. The inner wall withstands fluid pressure due to the fuel, which pressure may be merely due to the dead weight of the fluid, or might also be due to artificial pressurization necessary to cause proper feeding of the fuel; while the outer wall withstands aerodynamic loads and structural loads of the aircraft.

It is the object of this invention to provide a tank wall construction which incorporates a wet type insulation within the tank so that the outer surface of the tank forms a structural part of the aircraft and the outside contour thereof.

It is another object of this invention to provide an insulated aircraft fuel tank construction of minimum weight.

It is another object of this invention to provide an integral insulated aircraft fuel tank construction in which all fluid pressure and structural loads are carried by a single structural wall.

Other objects of invention will become apparent from the following description taken in connection with the accompanying drawings, in which Fig. 1 is a sectional view of one embodiment of the invention;

Fig. 2 is an enlarged view of the device shown in Fig. 1;

Fig. 3 is a perspective view of a second embodiment of the invention;

Fig. 4 is an enlarged view of the device shown in Fig. 3;

Fig. 5 is a perspective view of the invention as applied to a fuselage tank for a jet aircraft;

And Fig. 6 is a detailed view of the device shown in Fig. 5.

Referring to the drawings, the invention is shown as applied to an integral fuel tank forming a part of the fuselage of an aircraft, although it is to be understood that the invention may also be applied to integral wing tanks and to other tanks of aircraft or of stationary equipment wherever heat insulation is required. In Fig. 1, structural wall 1 of steel, aluminum, plastic, or any other structural material is lined with a porous material 2, such as Fiberglas. Inside porous layer 2 a thin foil layer 3 is laid. Foil layer 3 is light in weight and essentially non-structural, and is attached at infrequent intervals to wall 1 by small clips 4 of suitable design. Foil layer 3 is perforated at infrequent intervals throughout its length and breadth so that porous material 2 is completely soaked with fluid 5 contained within the tank. Bearing in mind that this construction is intended for use as a heat insulating means, the following is offered as an explanation of its functioning: When heat is applied to the exterior of wall 1, which heat in the case of an aircraft integral tank is generated by passage of the aircraft through the atmosphere, fluid which is contained within the interstices in porous material 2 tends to vaporize along the inside surface of wall 1. Tiny vapor bubbles form, and if it were not for the presence of porous material 2 and foil layer 3 these tiny vapor bubbles would rise to the free surface of fluid 5, causing convection currents and heating of the entire contents of the tank. However, the presence of porous material 2 impedes the motion of such vapor bubbles tangentially of the tank. Foil layer 3 prevents their movement in the direction normal to the surface of the tank so that the tiny bubbles are, in effect, trapped within the porous material. These tiny bubbles prevent the rapid conduction of heat from the outside surface of the tank to the fluid within the tank, because their heat conductivity is very much less than that of the fluid contained in the tank.

Convection currents are very largely prevented by the presence of the porous material. Likewise, the entrance of heat into the interior of the tank by radiation is largely prevented by foil layer 3 which is preferably a thin metallic sheet, such as aluminum foil.

Orifices as at 11 in Fig. 4 are provided to permit the replenishment of the fluid within porous layer 2. The amount of communication between the main body of fluid in the tank and the fluid in the porous layer, the temperature differential between the medium surrounding the tank and the tank's contents, and the effectiveness of this invention for insulation are all interrelated. First of all, it must be recognized that if the foil layer were airtight, vapor pressure would build up on its exterior surface due to boiling of the fluid within the porous layer. Structural failure of the foil layer would then be likely. On the other hand, if a great many perforations are present in the foil layer, a considerable leakage of vapor takes place into the interior of the tank, thus partially destroying the insulation attributable to the vapor layer and causing convection currents within the tank. Also, if the external temperature to be insulated against is very high, more vaporization occurs, lowering the average density of the porous layer and improving its insulating properties. Production of more vapor, of course, increases the vapor pressure to be withstood by the foil layer. This increased pressure must then be relieved by limited escape of fluid or vapor through the perforations in the foil. This invention contemplates keeping the foil layer thin enough to be of nominal weight, but strong enough to withstand the vapor pressure of wet vapor or nonsuperheated vapor. This vapor pressure for such liquids as gasoline, liquid oxygen, or alcohol may be up to about five pounds per square inch above the ambient pressure in the tank. Hence the light foil layer, having a thickness not to exceed 1/64 inch, will suffice so long as enough perforations are provided to permit fluid to enter the porous layer at a rate somewhat greater than that at which it is being vaporized.

In Figs. 3 and 4 a slightly modified form of the invention is shown wherein the inner foil layer 6 is shown corrugated for the purposes of further reducing convection and migration of vapor bubbles tangentially of the tank wall and stiffening the foil layer. Stringers 12 for stiffening outer wall 13 and for supporting foil layer 6 extend throughout the length of the tank.

In Figs. 5 and 6 there is shown a third embodiment of the invention as applied to a jet aircraft structure of the monocoque type employing a stressed skin 7, stringers 8, and ribs 9. In this embodiment of the invention, porous material is laid over the conventional aircraft structure in an irregular manner, as shown in Fig. 5, so that the skin and its associated stiffening members are not allowed to contact the fluid to be contained within the structure. The foil layer 10 is then laid, also in an irregular manner, over the porous layer supported by clips 14 as needed. With the embodiment of the invention shown in Figs. 5 and 6 the aircraft may be designed and constructed in the usual manner and the insulation may then be applied to the interior thereof. Even the small heat conduction which occurs through stringers 12 in Figs. 3 and 4 is virtually eliminated in the embodiment of the invention shown in Figs. 5 and 6 because a substantially completely closed vapor layer separates foil layer 10 from skin 7 and its stiffening structure.

While the various foil layers shown in the three embodiments of the invention just disclosed are shown with infrequent holes or perforations, it is to be understood that in actual practice the leakage around joints and construction holes, rivets and cutouts may be adequate to afford the limited communication required between the main body of fluid contained in the tank and the fluid wetting the insulation. The foil layer also serves the purpose of keeping porous material 2 in place adjacent to the tank wall.

The embodiment of the invention shown in Fig. 5 illustrates the adaptability of this invention to the geometry of a jet type aircraft. The duct structure must have a smooth wall internally for efficient operation of the jet power plant at high speeds. The inside wall must therefore be monolithic with whatever insulation is required provided within the tank. If a double structural wall were required the resultant structure would be inefficient and heavy. By use of this invention, however, only the inner wall 15 need be structurally sturdy. Insulation of the tank from the hot gases in the duct is provided by the action of porous layer 16 and foil layer 17 in trapping vapor bubbles and inhibiting their migration. As in the embodiments of the invention shown in Figs. 1 and 3, the foil layer must be perforated to allow replenishment of the liquid within the porous layer at least as fast as it is vaporized and to prevent excessive buildup of vapor pressure. In all the embodiments of the invention the porous layers may be fibrous asbestos, cork, felt, vermiculite, wood fiber, rock wool, slagwool, stone felt, or other porous materials.

It has been found that this insulation is particularly suited to use in a guided missile designed to travel at supersonic speeds. At such speeds the missile surfaces become heated by skin friction. The outside contour of the missile must be very smooth, thus necessitating insulation inside the structural shell thereof. Weight and space are critically limited. All these limitations are satisfied by the insulation disclosed herein. Further, although the effectiveness of the wetted insulation is only about one-third that of an equivalent thickness of dry insulation, the time of flight of a supersonic missile is short enough so that the temperature of the fuel or propellant (such as kerosene, liquid oxygen, or alcohol) does not exceed a safe value before it is consumed.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a supersonic aircraft which has fuel tanks integral with said aircraft, a fuel tank comprising a liquid-tight container whose outside surface is subject to heat of friction due to flight of said aircraft through the atmosphere, a layer of porous material lining the interior of said container, a liquid, said porous material immersed in said liquid, and a thin discontinuous nonstructural sheet inside said porous layer for holding said porous material in place and for entrapping vapor generated on the inside surface of said container to thereby contain said liquid while insulating it.

2. Heat insulated structure for containing a liquid comprising a wall structure, a layer of fiber glass on the inside of said wall, a liquid, said fiber glass immersed in said liquid, and a thin layer of foil inside said fiber glass layer, said layer of foil having just enough perforations to allow said fiber glass layer to be continuously wet whereby if heat is applied exteriorly of said wall structure, vapor bubbles formed in said liquid on the inside thereof are trapped by said fiber glass and by said foil layer to inhibit heat flow into the interior of said structure.

3. An integral insulated aircraft fuel tank comprising a fluid-tight wall internally reinforced to carry structural loads, a layer of fiber glass laid on the inside of said wall, a liquid, and a thin layer of fluid-tight material within said fiber glass layer perforated sufficiently to allow said liquid in said tank to keep said fiber glass continuously wet, whereby if heat is applied to the exterior of said tank, vapor bubbles form on the inside of said wall and are trapped by said fiber glass material and by said thin layer to inhibit heat flow into said tank.

4. A device as recited in claim 3 in which said thin layer comprises corrugated, metallic foil.

5. In a supersonic aircraft which has tanks integral with said aircraft a tank comprising a liquid-tight container whose outside surface is subject to heat of friction due to flight of said aircraft through the atmosphere, a layer of porous material lining the interior of said container, a liquid, said porous material immersed in said liquid, and a thin, discontinuous, nonstructural sheet inside said porous layer for holding said porous layer in place and for trapping vapor generated on the inside surface of said container to thereby contain said liquid while insulating it.

6. A device as recited in claim 5 in which said nonstructural sheet comprises a layer of aluminum foil having sufficient perforations to keep said porous material wet.

7. A device as recited in claim 5 in which said porous material comprises fiber glass.

8. An integral insulated aircraft tank comprising a fluid-tight wall internally reinforced to carry structural loads, a layer of porous material laid on the inside of said wall, a liquid, and a thin layer of fluid-tight material within said layer of porous material, said layer of fluid-tight material being perforated sufficiently to allow said liquid in said tank to keep said porous material continuously wet, whereby when heat is applied to the exterior of said tank, vapor bubbles form on the inside of said wall and are trapped by said porous material and by said thin layer to inhibit heat flow into said tank.

9. A device as recited in claim 8 in which said porous material comprises fiber glass.

10. A device as recited in claim 8 in which said thin layer comprises aluminum foil having sufficient perforations to keep said porous material wet.

11. A device as recited in claim 8 in which said porous material comprises fiber glass and in which said thin layer comprises corrugated, metallic foil.

References Cited in the file of this patent

UNITED STATES PATENTS

| Number | Name | Date |
| --- | --- | --- |
| 644,259 | Ostergren | Feb. 27, 1900 |
| 1,835,370 | Bellanca | Dec. 8, 1931 |
| 1,870,595 | Thaden | Aug. 9, 1932 |
| 2,150,181 | Munters | Mar. 14, 1939 |
| 2,194,301 | Fourness et al. | Mar. 19, 1940 |
| 2,214,294 | Day | Sept. 10, 1940 |
| 2,318,744 | Brown | May 11, 1943 |
| 2,385,146 | MacDonald | Sept. 18, 1945 |
| 2,397,184 | Klose | Mar. 26, 1946 |
| 2,519,393 | Noyes | Aug. 22, 1950 |
| 2,520,972 | Siple | Sept. 5, 1950 |

OTHER REFERENCES

Ser. No. 291,636, De Muyser (A. P. C.), published May 25, 1943.